United States Patent [19]

Slater

[11] 4,245,298

[45] Jan. 13, 1981

[54] SYSTEM FOR CREATING A SERVO CONTROL SIGNAL

[75] Inventor: Dan Slater, La Habra, Calif.

[73] Assignee: Magicam, Inc., Hollywood, Calif.

[21] Appl. No.: 3,742

[22] Filed: Jan. 15, 1979

[51] Int. Cl.³ .................................... G06F 15/46
[52] U.S. Cl. .................................... 364/118; 318/604; 352/53
[58] Field of Search ............... 364/118, 110; 318/600, 318/601, 603, 604, 568, 569, 625, 632; 358/158, 183; 352/53

[56] References Cited

U.S. PATENT DOCUMENTS

| | | | |
|---|---|---|---|
| 3,752,969 | 8/1973 | Kiffmyer et al. | 364/118 X |
| 3,828,168 | 4/1974 | O'Callaghan et al. | 364/118 X |
| 3,902,798 | 9/1975 | Trumbull et al. | 352/85 |
| 3,914,540 | 10/1975 | Slater | 358/158 |
| 3,917,930 | 11/1975 | Davey et al. | 364/118 X |
| 3,987,282 | 10/1976 | Lau et al. | 364/118 |
| 4,084,083 | 4/1978 | McNally et al. | 364/118 |
| 4,086,522 | 4/1978 | Engelberger et al. | 364/118 X |
| 4,146,922 | 3/1979 | Brown et al. | 364/118 |

Primary Examiner—Joseph F. Ruggiero

Attorney, Agent, or Firm—Meyer, Tilberry & Body

[57] ABSTRACT

A system for creating a control reference signal for a remote electrical servo device having a movable output unit wherein the velocity and position of the output unit are controlled by the vector magnitude of the control reference signal. This system includes a digital circuit for creating a first fixed analog signal indicative of a known or desired velocity for the unit during a preselected controlled time interval and a second digital means for creating a desired time base positional profile during the preselected time interval. An encoder arrangement is employed for detecting the actual time base positional profile of the servo output unit during the given time interval so that an analog signal generally proportional to the algebraic difference between the actual and desired time base positional digital profile can be created at various times during the time interval. The control reference signal is then created by a summing circuit as a function of both the first and second analog signals the first of which is proportional to a desired velocity and the second of which is proportional to the algebraic difference between a desired and actual position of the servo output unit.

28 Claims, 14 Drawing Figures (SINGLE AXIS CONTROL)

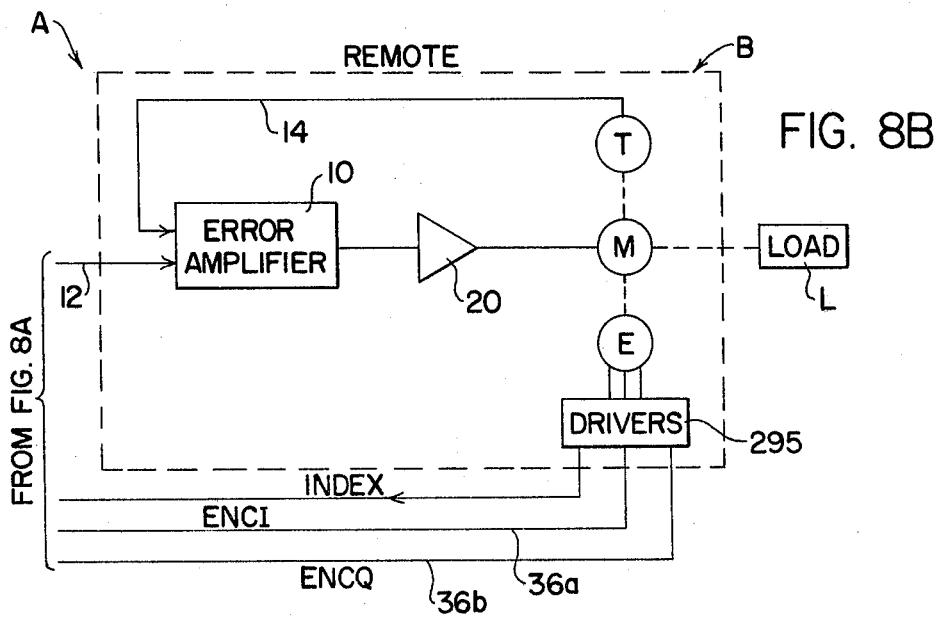
FIG. 8B
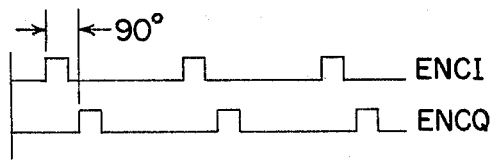
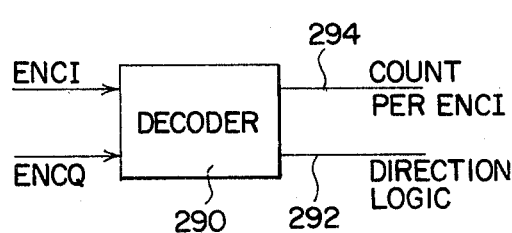
FIG. 10

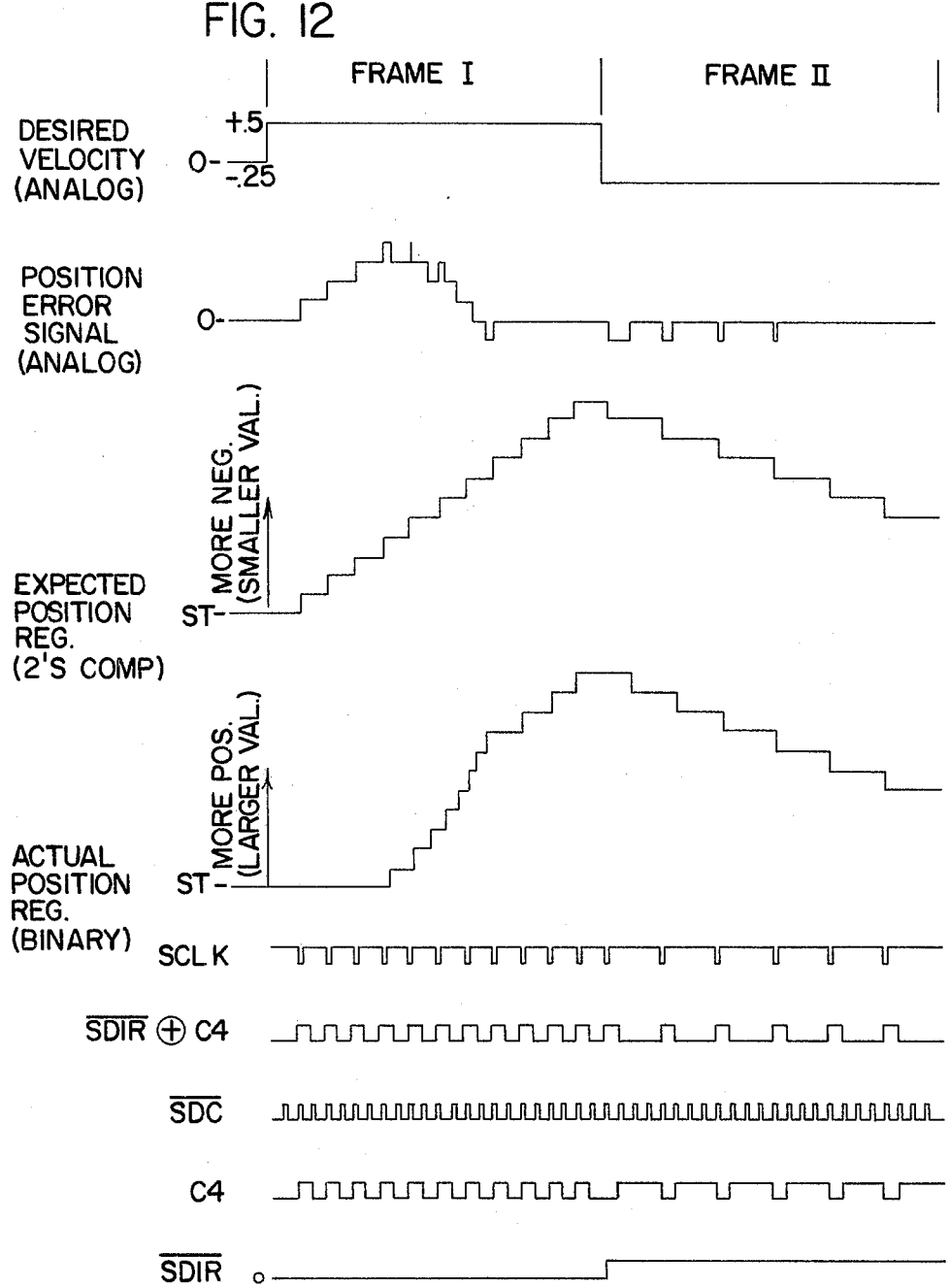

SYSTEM FOR CREATING A SERVO CONTROL SIGNAL

The invention relates to a system for controlling a remote servo device and more particularly to a system for creating a control signal for such a remote servo device. The invention is particularly applicable for controlling the position of a camera in response to sequentially stored digital information and it will be described with particular reference thereto; however, it is appreciated that the invention has broader applications and may be used in various types of servo systems wherein the instantaneous position of an output load of a servo device must be accurately controlled without interconnecting mechanical linkages and without following a corresponding, contemporaneously operated master unit.

BACKGROUND OF THE INVENTION

As is well known, photographic systems have been provided for some time in which foreground and background scenes are photographed by separated cameras. The foreground scene is photographically or electronically combined with the background scene to form a composite picture or video signal. Such systems are illustrated in prior U.S. Pat. No. 3,902,798, and 3,914,540 which are incorporated by reference herein. In each of these systems, a foreground camera is maneuvered on an appropriate dolly to photograph the foreground, usually actors, to be used with a corresponding background scene. To accomplish this, it is necessary that the background camera be moved in accordance with movement of the foreground camera, taking into consideration the differences in size of the scenes and the geometry of the supporting structure for the two cameras. When using this type of composite photography, it is usually necessary for the cameras to move in a coordinated fashion to create the desired final photographic results. When such systems are used for television, coordination between the two cameras is not as critical as when the system is used for wide angle motion picture film which have a high visual detail level. In any event, there has been a substantial demand for the development of a system which would control the slave or background camera in accordance with the foreground camera without requiring that both cameras operate in unison or even at the same time. Thus, the use of a master unit on the foreground camera which drives a servo controlled slave unit on the background camera is not completely satisfactory although it works quite well and has enjoyed substantial commercial success.

The present invention relates to an improvement in controlling a remotely located electrical servo device by the use of stored data, as opposed to the more common master-slave concept. By using this system, the synchronization of the remote unit is improved and the remote unit may be operated at a different time or at any location away from the unit which generates information indicative of the position to be assumed by the remote servo device.

THE INVENTION

The invention is a system for creating a controlled reference signal for a remote electrical servo device having a movable output unit wherein the velocity and position of the output unit are controlled by the vector magnitude of the control reference signal. As is well known, various servo systems have the position and/or velocity controlled by an input reference signal. This system differs from prior systems in that there are means separate from a master for creating a first fixed analog signal indicative of a known or desired velocity for the remote unit during a preselected controlled time interval. This time interval may be coordinated with the time of the frame of a motion picture film or any other very short real time periods. After creating this fixed analog velocity signal, the system includes a coordinated means for creating a desired time base positional profile which is to be followed during the time lapse of the time interval. By providing means for detecting the actual time base profile of a unit as it moves during the time interval, these two profiles may be compared to create a second analog signal which is generally proportional to the algebraic difference between the actual and desired time base profiles at a plurality of times during the time interval being processed at any given instance. The two analog signals are then compared, such as in a conventional summing circuit or amplifier, so that a controlled output reference signal is created as a function of both velocity and the position offset of the device being controlled.

By using this concept, a digital word, such as can be stored and successively outputted from a digital computer, can be used to control the desired velocity and the desired position during the short time intervals which are being processed at a given instance. A next digital word can then be created which will control the velocity and position signals during the next time interval. By creating these velocity and position offset signals successively in very short time intervals, the servo device which receives a control signal is moved in unison with a plurality of successive binary stored data words. This type of stored data can be created on a tape, disc or other arrangement by numerical units or by actually reading the control function from a previously operated unit such as the foreground camera of a composite photographic system of the type illustrated in the two previously mentioned United States Letters Patents.

In accordance with another aspect of the invention, the system includes a digital register for storing a digital number representing the desired velocity for any given interval. This digital number may change from interval to interval to control the system in accordance with successively generated digital signals, which are converted to analog signals and summed.

In accordance with another aspect of the invention, the desired time base positional profile against which the actual positional profile of the controlled servo device is compared is generated by a bi-directional digital counter of the up/down counting type. This counter is incremented or decremented periodically during the time interval to coordinate the desired position with the magnitude of the velocity signal being used to control the remote servo device. Of course, the actual time base positional profile is detected from the remote servo device and can be stored in a bi-directional counter for comparison with the desired or expected profile also stored in such a counter. As the output load of the remote device is moved in one direction, the bi-directional current position counter is counted in one direction and when the output load is moved in the opposite direction, the current position counter is counted in the opposite direction. Thus, a conventional bi-directional digital counter can be used to accurately indicate the exact, current position of a remote output load. For this purpose, any one of several types of encoders could be connected to the output load for determining the output position on the basis of the number contained in the current position counter.

By using a 2's complement digital to analog converter, the direction of the velocity and the direction of the difference in the positional profiles can have an algebraic sign indicative of servo direction. In this manner, the analog signal representing the desired velocity and the analog signal indicative of the offset of the actual position can be algebraically added to control the rate of movement of the controlled servo device.

In accordance with the invention, a plurality of time intervals are created during which a coded digital signal is used to control the reference signal for a remote servo unit or device. During this same interval, a further analog control signal is created which is generally the difference between a desired position of the servo device and the actual position of the servo device. In accordance with one aspect of the invention, this positional analog difference signal is created by a digital circuit having a first counter for creating a desired profile during a given time interval and a second counter for registering the actual position of the remote servo device as provided by an appropriate real time encoder.

OBJECTS OF THE INVENTION

The primary object of the present invention is the provision of a system for creating a controlled reference signal for a remote electrical servo device having a movable output unit or load, wherein the velocity and/or position of the output unit are controlled by the value of the control reference signal, which system provides accurate control of the remote load in accordance with a desired scheme formed as a series of successive, coded binary words.

Another object of the present invention is the provision of a system as defined above, which system utilizes digital circuitry for controlling the analog input of the servo device in accordance with data available to the digital circuitry.

Still a further object of the present invention is the provision of a system as defined above, which system does not require direct communication between the servo device and a master device.

Another object of the present invention is the provision of a system as defined above which system modifies the operation of the remote device by both an expected velocity and the actual position of the device during the operation of the invention.

Still a further object of the present invention is the provision of a system as defined above, which system employs a series of successive, short time intervals during which the analog signal used to control the external or remote device is controlled by an externally created data signal.

Still a further object of the present invention is the provision of a system as described above, which system employs short time intervals and controls the motion of the remote device by a different magnitude during successive time intervals.

Still a further object of the present invention is the provision of a system as defined above, which system uses digital circuitry to produce a fixed and variable analog signal which are combined to create a control signal for the remote servo device.

Another object of the present invention is the provision of a system as defined above which system is operative by a series of stored words of digital data to control analog signals in successive intervals during which the data is stored for use by the system.

Still a further object of the present invention is the provision of a system as defined above, which system modifies the desired position of the remote device during a time interval while the desired velocity of the device remains the same so that the system tracks a velocity controlled servo with a positional modulating or attenuating signal.

These and other objects and advantages will become apparent from the following description.

BRIEF DESCRIPTION OF DRAWINGS

In the description the following drawings are employed:

FIG. 10 is a combined pulse diagram and block diagram illustrating the encoder decoding concept employed in the preferred embodiment of the present invention;

PREFERRED EMBODIMENT

Figure 1:
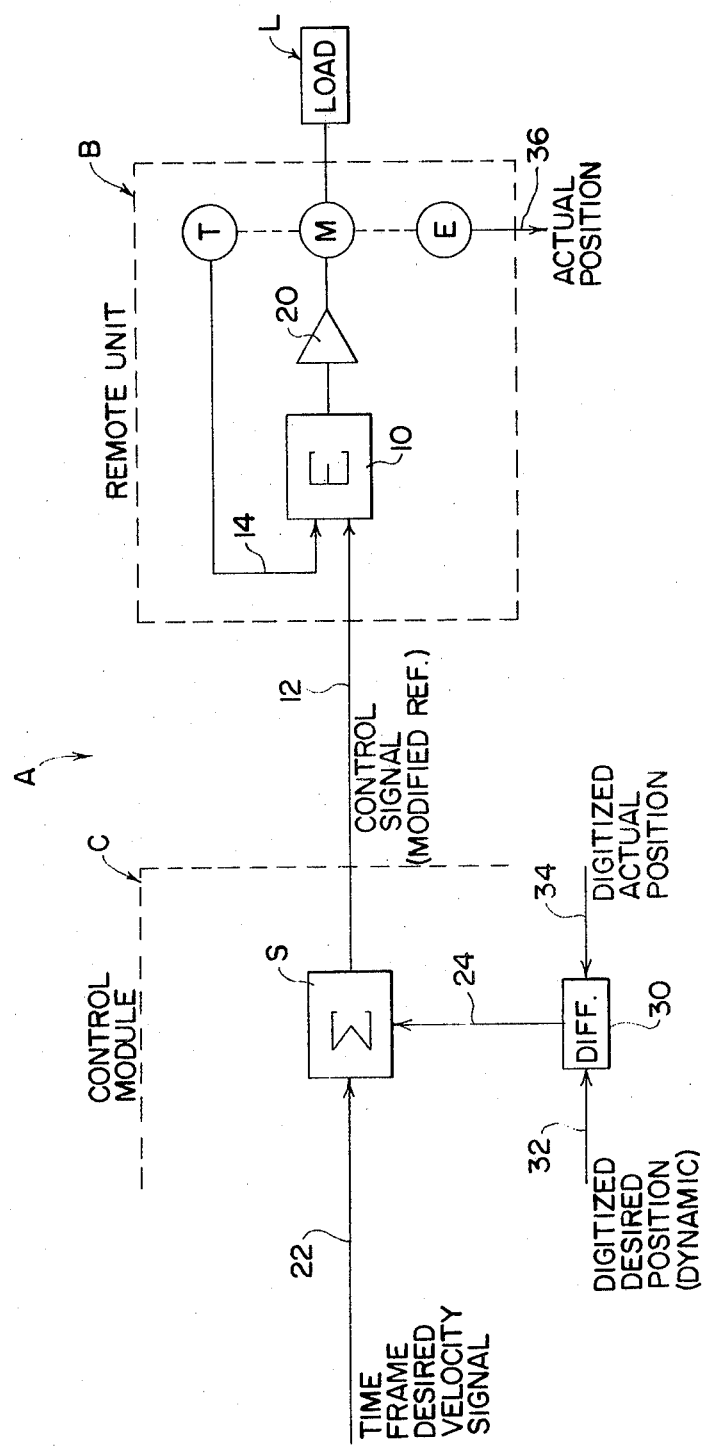
FIG. 1 is a schematic block diagram illustrating certain operating characteristics of the present invention.

Referring now to FIG. 1, wherein the showings are for the purpose of illustrating certain concepts of the present invention and not for limiting same, system A includes a remotely located servo unit or device B having certain components which are somewhat standard and a control circuit or module C which is partially illustrated for the purposes of simplicity. Remote servo unit or device B includes a D.C. motor M which moves the load L in each of two opposite directions, be it angular, linear or combinations thereof. The motor shaft also drives a tachometer T having an electrical output which is proportional to the speed of motor M. This concept is in accordance with standard servo mechanism practice. An optical shaft encoder E provides quadrature incremental position pulses when a portion of the encoder is rotated by the shaft of motor M. These pulses are combined in module C to generate an actual positional position, as will be described in more detail later. Essentially, the encoder provides information on the position of the motor and load L in line 36. A servo error preamplifier 10 amplifies the difference between the desired servo velocity which is an analog signal appearing on line 12 and the actual servo velocity which is an analog signal appearing on line 14 under the control of tachometer T. The difference between these two analog signals is applied to a standard motor driving amplifier 20 which controls the speed of motor M so that the output of the tachometer closes the servo loop to allow the load to be moved in accordance with the analog voltage on input line 12. To create this analog input voltage to be used as a reference in preamplifier 10, there is provided circuitry C for each movement to be applied to an appropriate external load L. Each of these circuits or modules, as illustrated in FIG. 1, includes a desired velocity signal in line 22, which signal changes periodically from one time frame or time interval to the next. Of course, adjacent intervals could have the same velocity signal if that is the desired operation of remote device B. Thus, a fixed analog signal appears in line 22 but the signal may change from time interval to time interval. The resolution of the system can be controlled by changing the length of the time interval. In practice, when used in a motion picture system the time frame has a length of time correlated to the time spacing of a single film frame. In television work, the resolution may be substantially different; however, the time interval or time frame is generally less than about 30 seconds. The time frame or interval can be varied substantially to obtain the desired motion of load L in response to operation of module C. The analog signal representing the desired velocity during a given time frame or time interval is applied to a standard summing circuit or amplifier S having a second input analog signal on line 24 from a digital difference circuit 30. This circuit will be described in more detail with respect to FIG. 8A wherein the circuit is divided into sub-components 30a, 30b which record a digital difference and convert this digital difference to an analog signal for application on line 24. The difference circuit 30 receives two digital inputs. The first digital input is a desired position which changes during the time frame or time interval and generally corresponds to the desired position of load L at various positions of the time frame or interval being processed. This desired or expected position for load L is applied to circuit 30 through a plurality of lines represented as single line 32. In a like manner, the output of encoder E which detects actual position of load L is digitized and applied to difference circuit 30 through a plurality of lines indicated as a single line 34. Thus, the analog signal in line 24 applied to summing circuit S is an analog representative of the difference between the actual or current position of load L with respect to the expected or desired position of this load as stored and modified within module 30 and independent of remote device B. These features of the invention will be explained in more detail later in connection with FIGS. 8A, 8B.

Figure 2:
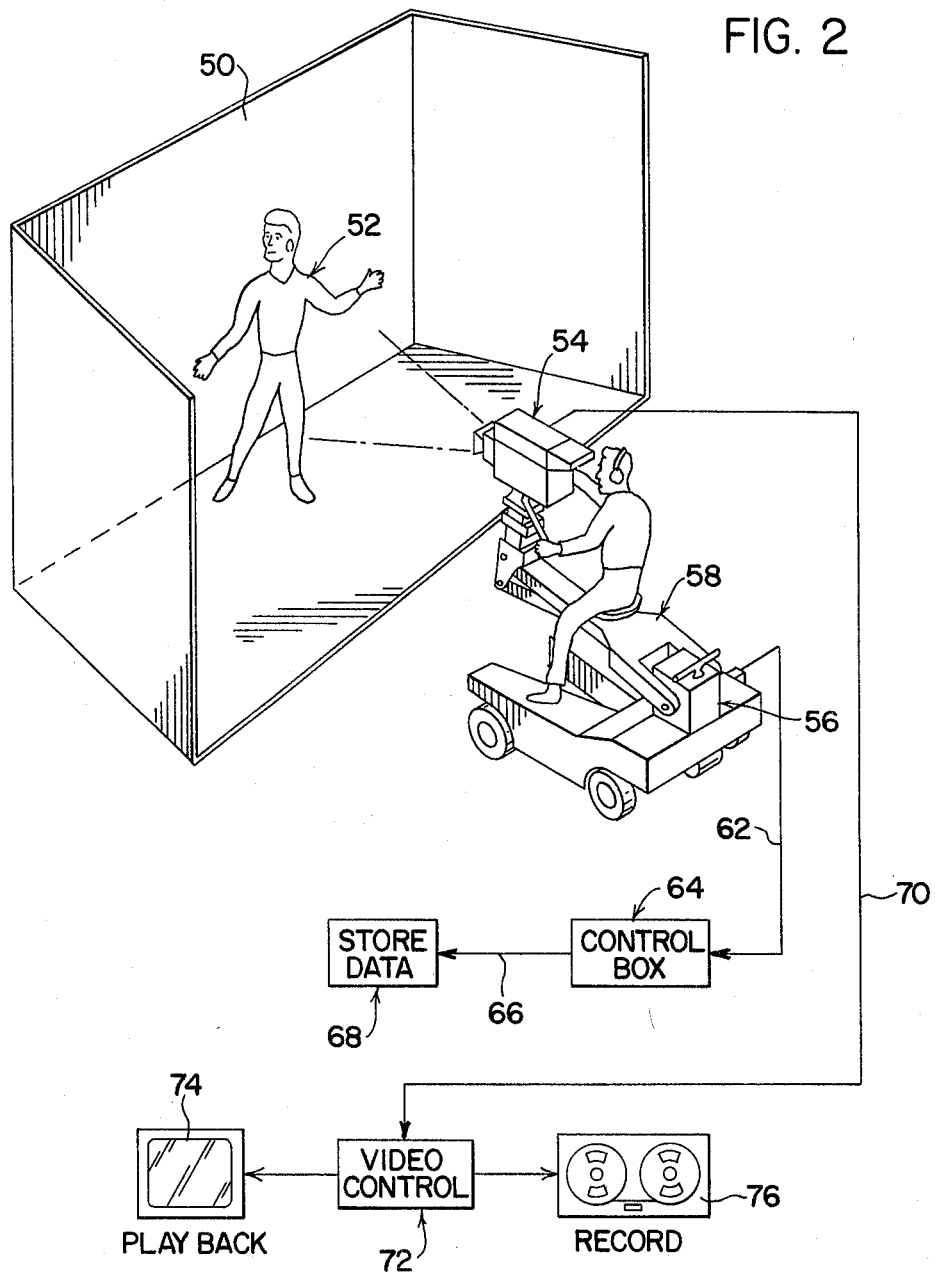
FIG. 2 is a schematic combined block diagram and pictorial view illustrating one type of unit for developing data used in the preferred embodiment of the present invention.
Figure 3:
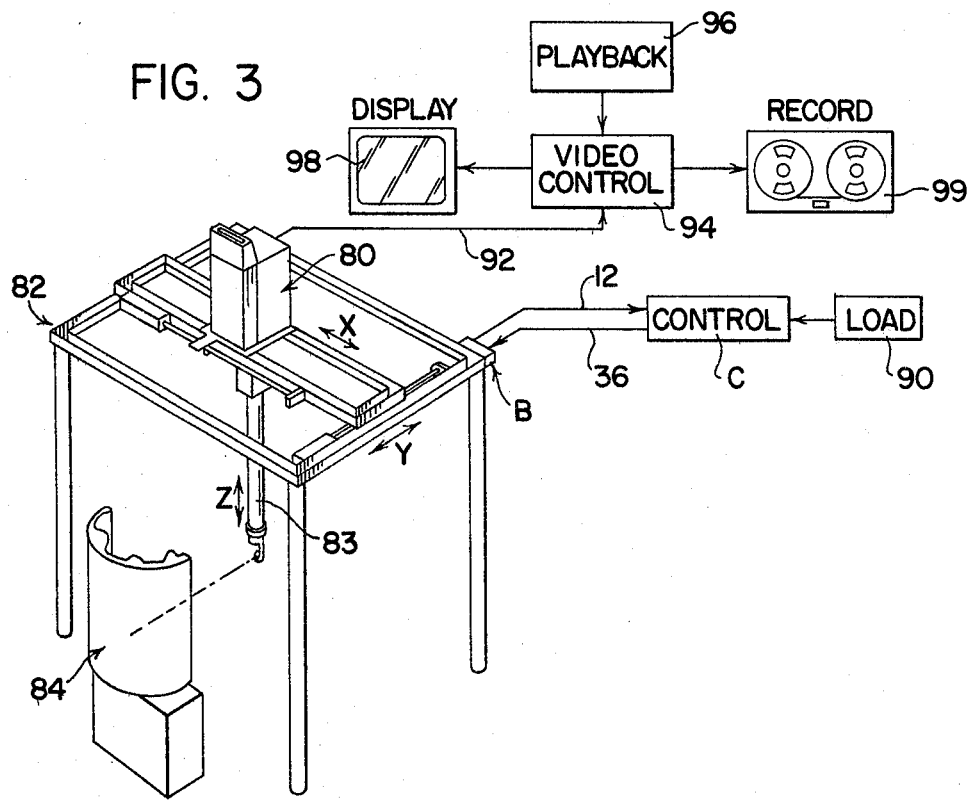
FIG. 3 is a schematic combined block diagram and pictorial view of one use of the present invention using data from the system illustrated in FIG. 2 or for another data source.

As will be explained later, control circuit or module C is operated by stored digital data as opposed to a master which is the normal procedure for controlling the movement of a remote servo device. Any one of various procedures could be employed for obtaining the desired data for use by circuit C. One such arrangement is illustrated in FIG. 2 which generally corresponds to the foreground camera system illustrated in prior U.S. Pat. Nos. 3,902,798 and 3,914,540 which are incorporated by reference herein. In each of these patents, the foreground camera is used to photograph on a color masked stage an actor which produces a portion of a composite photographic picture and which creates electrical signals indicative of the movement of several elements involved in the positioning of the camera with respect to the stage. Such electrical data could be converted to digital data and stored for use in control circuit C of the preferred embodiment of the invention. The stored data can be modified to compensate for geometric and size differences between the foreground and background camera. Of course, the digital information could be numerically created or created in other arrangements or could be used for systems other than a camera coordinating system. In FIG. 2, which is only illustrative in nature, stage 10 has a color that does not record and an actor 52 performs on this stage. Foreground camera 54 is carried by dolly 56 on a boom 58. Operator 60 controls the camera which causes movement of the boom, movement of the camera and movement of the dolly. Electrical signals indicative of each of these movements is directed to an appropriate control box or assimilator 64 which changes the data into a sequence of velocity words that are stored in an appropriate mechanism, such as a tape, disc or similar device. The transfer of information from the control box to the data storage unit 68 is represented by line 66. In accordance with standard practice as illustrated in the prior patents, a video information line 70 transmits the video information to a standard control 72 where it is displayed on unit 74 and recorded on tape unit 76. As so far described, the data in unit 68 is indicative of the movement of the camera 54 with respect to stage 50. Of course, there must be certain geometric conversions made in accordance with the disclosure of the prior United States patents incorporated by reference herein. The system as so far described does not form a part of the present invention and is set forth only as a possible source of the digital data which can be used in the present invention which is schematically illustrated in FIG. 1 and shown in more detail in FIG. 8. If the control data is created by the foreground camera of a composite photograph system as shown in FIG. 2, it can be used in controlling a background camera 80 movable on a control stand 82 and directed through a periscope 83 toward a reduced scaled scene 84, as shown in FIG. 3. Camera 80 is movable in the three orthogonal directions X, Y, Z and can be tilted or panned with respect to scene 84 in accordance with the previously recorded data indicative of the movement of foreground camera 54. Each of the movements of camera 80 is controlled by a single module C so that lines 12, 36 are duplicated in accordance with the desired number of movements of camera 80 with respect to scene 84. Appropriate digital data is loaded by unit 90 into control circuit C in accordance with a procedure which will be described later. The data in unit 90, for illustrative purposes only, is created in unit 68 and is a series of digital words indicative of the desired velocity of camera 80 during a succession of preselected time intervals. Of course, various other arrangements could be provided for creating the desired control signals or words which are processed in accordance with the present invention which will be described later. To complete the illustration of FIG. 3, a video line 92 is directed to a video control unit 94 which combines the play back 96 from tape unit 76 with the video signal in line 92 to provide a composite display in unit 98 and a composite recording in unit 99. This completes the description of FIGS. 2 and 3 which are illustrative in nature only and shows one of many system environments for which the present invention could be used.

Figure 4:
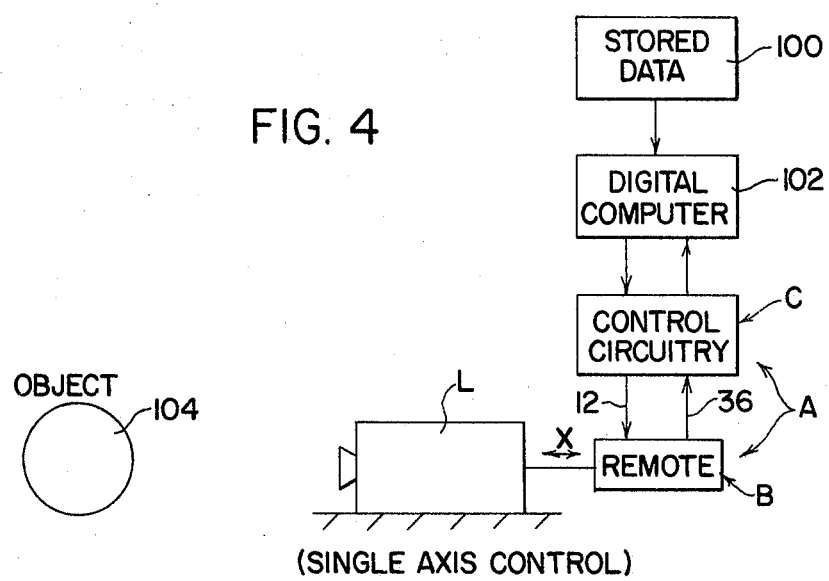
FIGS. 4–7 are general block diagrams illustrating certain environments which employ the present invention.
Figure 5:
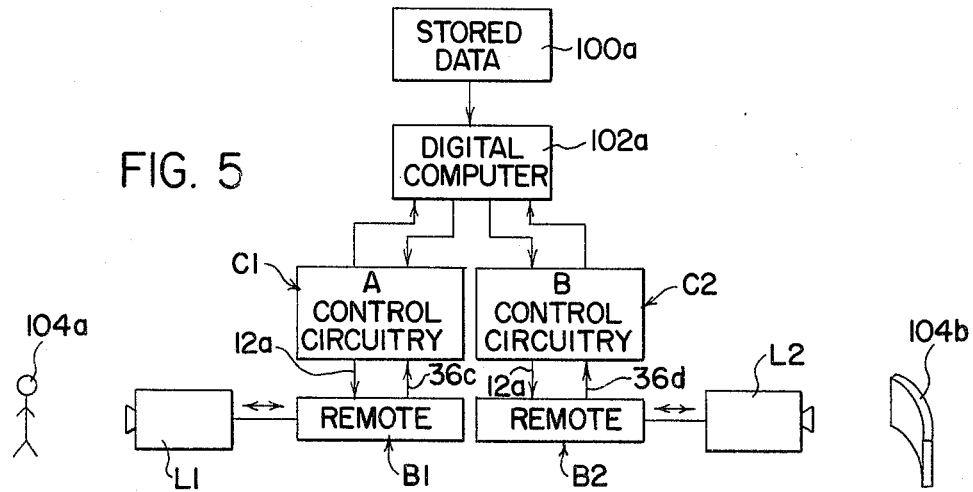
Figure 6:
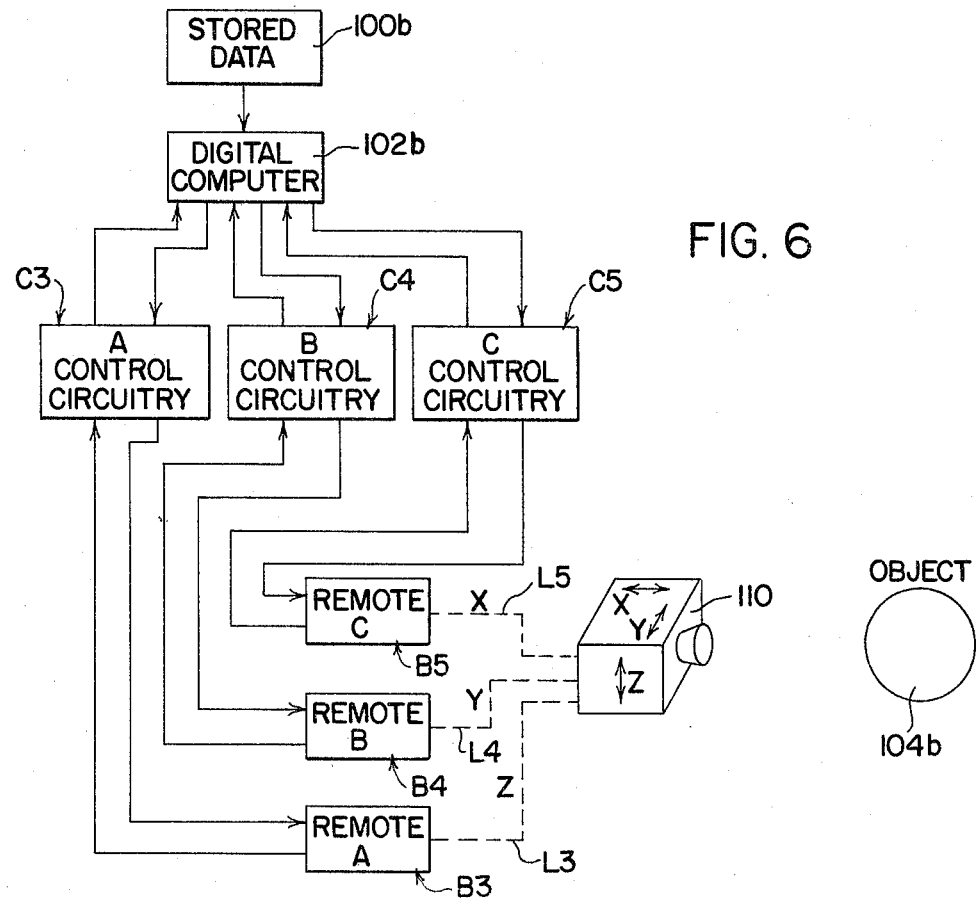
Figure 7:
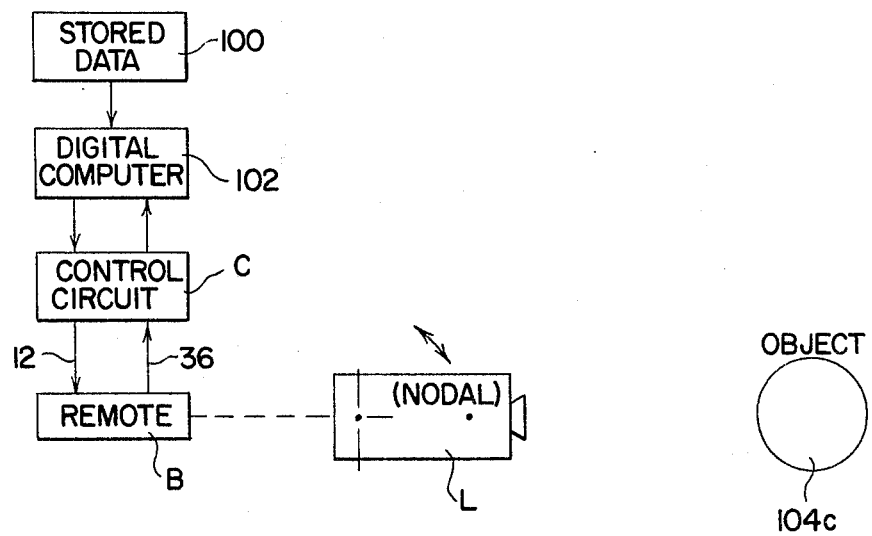

Referring now to FIG. 4, a general block diagram of a system employing the present invention is illustrated. In this diagram, stored data in unit 100 is provided with a plurality of digital words indicative of the desired velocity of load L which is illustrated as a camera as the camera is moved along a single axis. In this illustration, a standard digital computer 102 uses the stored data and transmits the stored data in succession and in parallel to circuit or module C for use in successive time frames or time intervals to move camera L with respect to an appropriate object 104 along axis X. Thus, FIG. 4 shows a single axis control arrangement. In FIG. 5, another representative system is employed wherein two control circuits C1, C2 are controlled by digital computer 102a from words in stored data unit 100a so that remote controls B1, B2 can move loads L1, L2. In this instance, load L1 could be a foreground camera and load L2 could be a background camera wherein the words to the foreground camera and background camera have a built-in geometric relationship as explained with respect to the previous United States Letters Patents. Thus, FIG. 5 illustrates a system wherein two control circuits C1, C2 constructed in accordance with the present invention controls two separate remote loads L1, L2. In FIG. 6, three separate control circuits C3-C5 are used to control three loads L3-L5 each of which controls the movement of a single unit, such as a camera 110, photographing an object 104b. Consequently, a control module C constructed in accordance with the present invention can be used to control movement of a remote object. If more than one object is to be moved, a control circuit or module can be used for each object. If a single element is to be moved in several directions, a separate control or module circuit C can be used for each axis and direction. If the present invention is to be used for rotating or panning a device, this can be done and is schematically illustrated in FIG. 7 wherein load L is a camera directed toward an object 104c. Remote unit C is used to rotate camera L in the angular direction indicated by the arrow in FIG. 7 in a manner that the camera is moved in a single direction in FIG. 4.

Each of the control units or control circuits C as previously described is constructed in accordance with the present invention as shown in detail in FIG. 8.

Figure 8A:
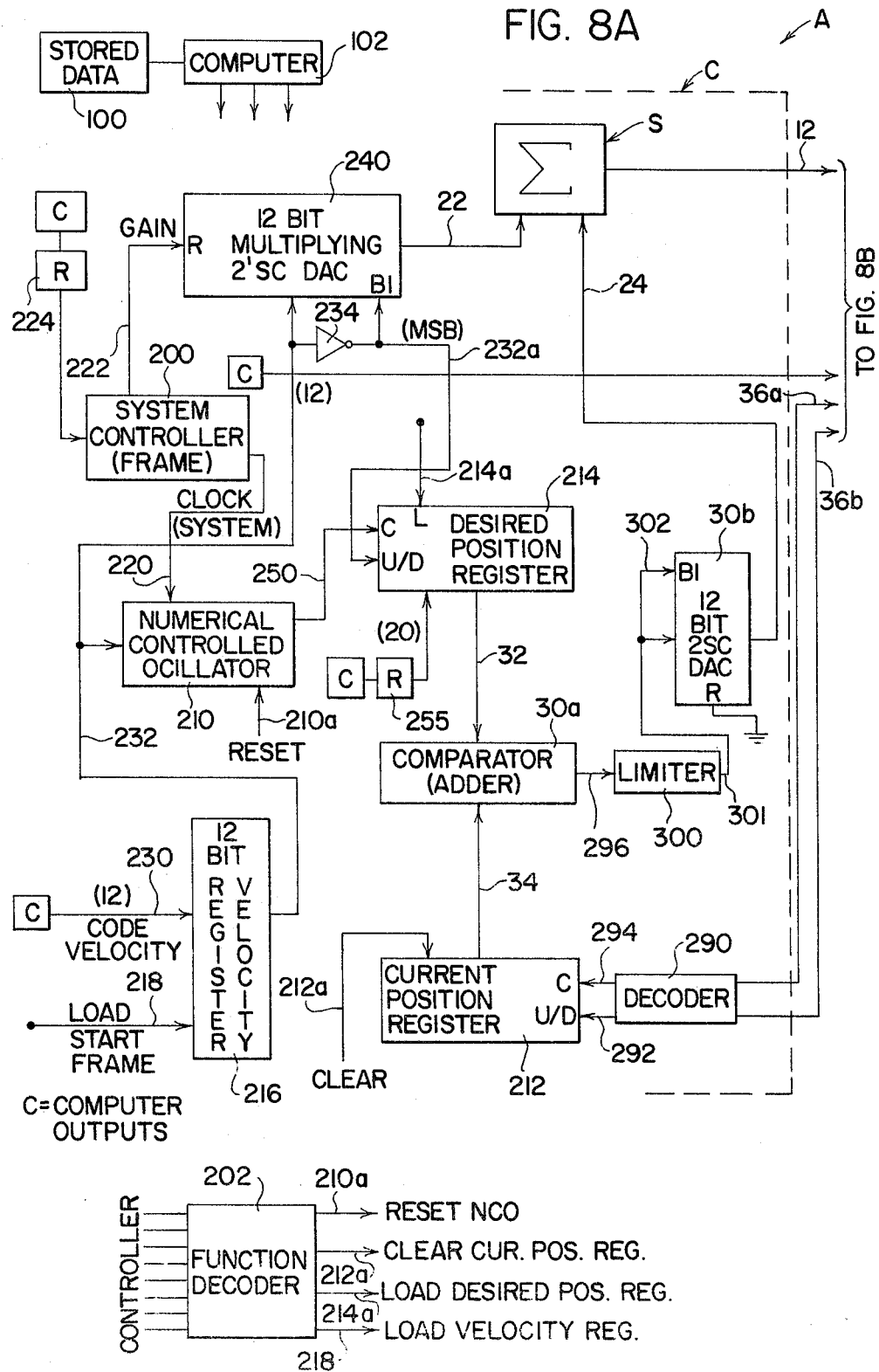
FIG. 8 is a combined block diagram divided into FIGS. 8A, 8B and wiring diagram illustrating the preferred embodiment of the present invention.

Referring now to FIGS. 8A, 8B, there is illustrated a preferred embodiment of the present invention wherein digital data is sequentially fetched from the stored data unit 100 and applied to the module or control circuit C, which may be one or more separate components supporting boards. In the preferred embodiment of the invention, as illustrated, circuit or module C includes a system controller 200 which generates a series of signals as set forth in FIG. 13. Of course, these signals could be created directly by the computer, by a controller especially when the controller 200 is of the programmable controller type or by a combination thereof. Irrespective of the source, various necessary, somewhat standard types of controlling pulses and a system clock or clocks are created by the joint action of the computer 102 and controller 200. These control signals operate the invention which relates to a manner for using the controller and computer information and not to the function of these components themselves.

In accordance with standard system controller practice, the digital control information used in the present invention may be supplied by various components. As shown in the lower left hand corner of FIG. 8B, some of the more basic signals employed in the preferred embodiment of the invention are illustrated. These signals are a reset pulse for the numerical controlled oscillator 210 which appears in line 210a, a clear pulse for the current position register or counter 212 appearing in line 212a, a load pulse for the desired or expected position register or counter 214 appearing in line 214a, and a load pulse for the velocity register which appears in line 218. These pulses are used to sequence the preferred embodiment of the invention in a manner to be explained later.

Numerical controlled oscillator 210, which is reset by a pulse in line 210a, receives the velocity i.e. delta position, word in digital form for the specific time interval or frame being processed. Thereafter, a pulse train is created in output line 250 which adds or subtracts in binary fashion from the content of the expected or desired position register 214. The current position register 212 is a 20 bit register which may be up counted or down counted and includes a digital representation of the current position as controlled and updated by pulses from encoder E of remote device B. The previously mentioned desired or expected position register 214 is a 20 bit register which may be up counted or down counted in accordance with standard digital practice. By providing 2's complement information in the desired position register 214, comparator 30a can be a standard 20 bit digital adder which adds the actual position to the 2's complement expected position to form a difference which is the absolute or algebraic positional error value in digital form. Of course, other digital comparing arrangements could be used. If the 2's complement were not used, a direct digital comparison could be made with various systems, such as a comparing gate network, to determine the amount of difference between the current position of load L as stored in one register and the desired position as stored in another register. In accordance with the invention, during a time frame a digital code representing desired position change is stored in 12 bit velocity register 216. The numerical controlled oscillator 210 updates the desired position during the time frame in accordance with the magnitude and sign of the stored velocity code in line 232. This provides desampling during each frame or timing interval. The positional error signal in line 24 is changed while a generally fixed velocity signal in line 22 is being directed to the summing amplifier S during a single time interval. Thus, the numerical controlled oscillator 210 updates the digital comparing circuit during a time frame having a length determined by pulses from system controller 200. During each time frame only a single velocity code is contained within a 12 bit velocity register 216; therefore, the velocity signal in line 22 remains fixed.

Figure 13:
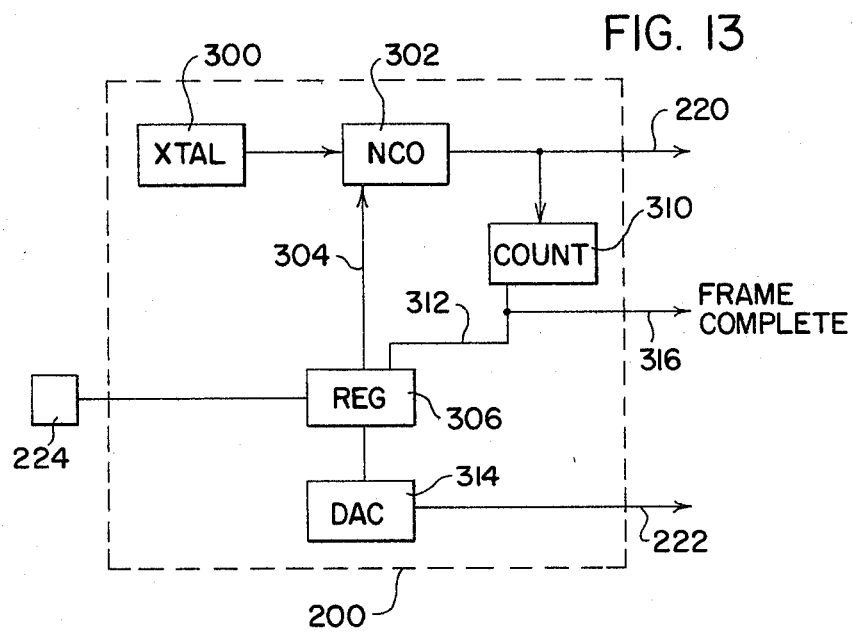

In accordance with the illustrated embodiment of the invention, system controller 200 creates a system clock on line 220, as shown in FIG. 13. This clock is used to provide the input clocking rate for numerical controlled oscillator 210. In a like manner, the system controller creates time scaling, a gain level or multiplier signal for a standard 12 bit multiplying 2's complement digital to analog converter 240 by creating an analog signal in line 222, as shown in FIG. 13. This analog signal and the clock are directly coordinated by the system controller 200 so that as the clock in line 220, increases the analog gain signal in line 222 increases proportionally. Also, the spacing between the starting pulses or loading pulses in line 218 for register 216 are inversely proportional to these two signals from the system controller. Controller 200 receives data from a storage register 224 which indicates the length of the current frame or timing interval being processed by system A. As the time frame is decreased, the reference to converter 240 is increased and the frequency of the clocking pulses to oscillator 210 is increased. Thus, system A is changed to operate at different time intervals which are coordinated by system controller 200. If a more accurate movement is required, a smaller time frame or time interval is used by system A. The length of the time frame is generally modified for each successive time frame.

As so far described, a digital delta position signal of 12 bits is directed to velocity register 216 from the computer 102 which receives the information from the stored data unit 100. Since the 2's complement coding is used in this system the most significant bit provides the sign or direction for the operation during a given time interval. The magnitude and sign of the velocity code for a given time interval is directed to converter 240 which produces a preselected fixed analog signal in line 22. The magnitude of this signal is determined by the digital coding of the velocity bits together with the gain control in line 222 in accordance with standard operating practices for such a converter. Thus, a fixed, expected or desired velocity analog signal is maintained in line 22 as a given time interval is being processed. In accordance with one aspect of the invention, the summing amplifier S is modulated during a time interval by the difference between the actual or current position of load L during the time frame as stored in register 212 on a system created reference in register 214. The digitized current position information of register 212 is compared to the desired or expected position created by module C in register 214 by any appropriate digital comparing technology. The digitized expected or desired position changes during the time frame at a rate controlled by the magnitude of the velocity code in register 216. The sign of the change is controlled by the most significant bit of the velocity code in register 216. Thus, the register containing the digitized expected position is incremented or decremented according to the sign and at a rate determined by the velocity code for a given time frame being processed. Various arrangements could be provided for the digital comparison; however, since the 2's complement code is used in the converters of the system and in the computer, the system illustrated in the preferred embodiment of the invention is employed to process 2's complement numbering. Circuit or module C employs a digital arrangement for indicating a velocity for a very short time interval, which velocity is used as a reference for the error amplifier 10 in a remote unit B. To trim or attenuate the signal in line 12 during the time frame, a digital updated desired position of register 214 is compared with a digital actual position of load L in register 212 to indicate changes in the actual operation of device B. This slight change is used to create an analog difference signal in line 24 which is summed with the analog velocity signal in line 22 to provide the desired final control analog value signal in line 12.

Referring now more particularly to the preferred digital arrangement for controlling the velocity estimate signal on line 22, the basic component of this arrangement is the velocity register 216 which is a 12 bit register that receives 2's complement data along twelve data lines shown as a single line 230. At the beginning of a time frame, a pulse in line 218 from function decoder 202 loads the 2's complement 12 bit data information for a given time frame into register 216. The output of this register is twelve lines shown as a single line 232. The most significant bit in this group of lines includes the sign or direction logic which appears in line 232a after it is inverted by inverter 234. The logic in this most significant bit line 232a controls the sign of the circuit C during a time frame and is directed to the standard B1 terminal of converter 240. As is known, this terminal is a sign or direction terminal to indicate the sign or direction of the analog signal in line 22. When using 2's complement coding, the most significant bit has a logic which determines whether the number is a positive or a negative number. The negative velocity indicates that the motor M is to rotate in one direction and a positive velocity indicates that the motor is to rotate in the opposite direction. The gain or reference line 222 from system controller 200 and the logic of the velocity bits applied to converter 240 determines the magnitude of the analog velocity signal within line 22 for any given time frame between pulses in line 218. The sign or direction is controlled by the logic on line 232a. As the next pulse occurs in line 218, a new code is selected from stored data unit 100 and directed through lines 230 to register 216. Thus, during each time frame a prescribed analog signal is applied to line 22 which remains fixed during the time interval. If the time interval or frame is to have a modified time length, a code is received from register 224 by controller 200. This changes the gain in line 222 and the system clock in line 220 as has been described. These changes in the length of the time interval are not affected by the code being loaded into register 216. Other arrangements could be provided for digitally controlling the analog signal in line 22.

As shown in the lower right hand portion of FIG. 8B, the velocity code is as a series of twelve bit words which are sequentially outputted from computer 102. An operation word or code is provided as needed and causes any desired operation from frame to frame or during initialization, such as resetting and loading certain registers. Also, the operation code can indicate the gain and clocking rate to be used during a given frame or time interval.

As so far described, circuit C provides an analog signal on line 22 which is to be added to the analog signal in line 24 for controlling error amplifier 10 of remote unit B. In accordance with an aspect of the invention, line 22 includes an analog signal which is controlled by digital circuitry to give the difference between the actual position of motor M and its load L and a desired or expected position as modified by the pulses in line 250 during a given time frame or time interval. The desired or expected position is changed in a direction and rate determined by the velocity code for any given time frame or interval. A variety of arrangements could be used for this purpose; however, in accordance with the illustrated embodiment of the invention, the twenty bit register 214 is loaded with the 2's complement of a desired position which position changes during the time frame by counting pulses in line 250. To update the desired or expected position in register 214, which is an up/down counter, the numerical controlled oscillator 210 receives the velocity code in lines 232 and the timing clock in line 220 from system controller 200. The velocity code and clocking rate determines the pulsing rate in line 250. Thus, as the velocity code is changed, assuming a fixed clocking rate, pulses in line 250 change proportionately. The clocking rate in line 220 is changed only to modify the length of the timing interval. The direction of counting for register 214 is controlled by the sign logic on line 232a as has been previously described. Thus, the direction of counting by pulses in line 250 is controlled by the sign of the velocity code during a time frame being processed. If the velocity code is in a first sign direction, register 214 is counted in a first direction. If the velocity code is in the opposite sign direction, the counter is counted in the opposite direction. Thus, counter or register 214 can determine the desired position from the start to finish of a time frame during which the velocity code remains the same. This, therefore, recognizes the fact that during a time frame having a fixed velocity control analog signal, the position of the motor will change as indicated by the modification of the digital number in register 214. During initialization, a register 214 is loaded with the desired starting position for operation of system A. This signal is in 2's complement coding and is loaded into register 214 at the start of a given operation cycle of system A. A digital representation of the actual position of load L is stored in current position register 212, which is a twenty bit register. The outputs of this register control the logic on twenty lines represented by a single line 34. These bits are compared with twenty bits on the corresponding lines, represented as line 32, from register 214. These two logics are then compared by an appropriate device, indicated as adder 30a. Encoder E provides an index pulse at a selected point in the movement of load L. This pulse is used to determine the relative position of the components at the start of a given cycle so that the expected position can be appropriately selected with respect to the existing position at the initialization of the system A. This is in accordance with standard encoder practice. Encoder E also provides an in-phase pulse ENCI on line 36a and a quadrature pulse ENCQ on line 36b. These two lines are directed from remote unit C to a decoder 290 in circuit C. This decoder determines the relationship between the encoder pulses to determine the direction of movement of load L by motor M, as shown schematically in FIG. 10. Pulses for each increment of movement are also created by decoder 290 which pulses may be the pulses on line 36a if desired. The actual movement direction for a given time frame is the logic contained on output line 292, which line is connected to the direction terminal of current position register 212. Pulses are then directed to the counting terminal C of register 212 from decoder 290 through line 294. Thus, register 212 is counted up or counted down according to the actual direction of movement of load L with respect to the fixed index point. The signals from the encoder are directed to circuit C through drivers 295.

The actual position of load or motor M is compared with the digital number in register 214 to provide an algebraic difference in twenty lines, shown as a single line 296. The code on these lines indicates the positional error. Lines 296 are converted by a standard twenty bit digital limiter 300 to produce a twelve bit coded representation of the magnitude of difference between the desired position and actual position as recorded digitally in registers 214, 212. This twelve bit difference information is provided in twelve lines, shown as a single line 301. The most significant bit in the difference code is directed to the B1 terminal of a twelve bit 2's complement digital to analog converter 30b which is the output of the difference circuit 30, as shown in FIG. 1. This converter creates an analog signal in line 24 which has a magnitude and sign indicative of the difference between the desired and actual position of motor M in remote unit B.

Figure 9:
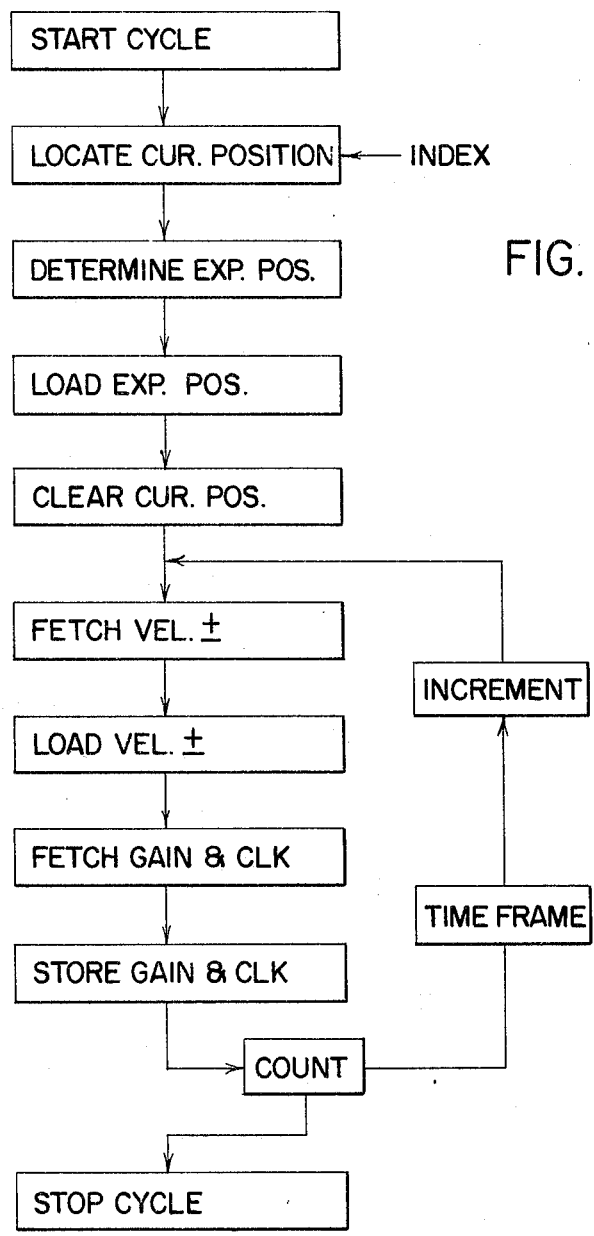
FIG. 9 is a simplified flow chart illustrating certain operational steps of the preferred embodiment as shown in FIG. 7.

Referring now to FIG. 9, a relatively simplified flow chart is illustrated to show the general operation of system A. In this chart, when the cycle is started, the current position is located with respect to the index point provided by encoder E. Thereafter, the expected position for the first frame is determined and loaded into register 255. The pulse in line 214a then loads the expected position in 2's complement coding into register 214. Also, a pulse in line 212a clears the current position register. This provides a starting point at the beginning of a cycle so that the current position register and desired position register are correlated in 2's complement fashion to provide essentially no difference in output line 24 of the difference circuit 30. Thereafter, system A cycles circuit or module C through time frames, each of which provides an arrangement to fetch a velocity code from the data stored in unit 100. This data is then loaded into register 216 at the same time that the gain and clock information is fetched and stored into register 224 controlling the time frame parameters of system controller 200. After a selected time frame, data is incremented for the next time frame. After a predetermined number of time frames, the cycle of system A is stopped.

Figure 11:
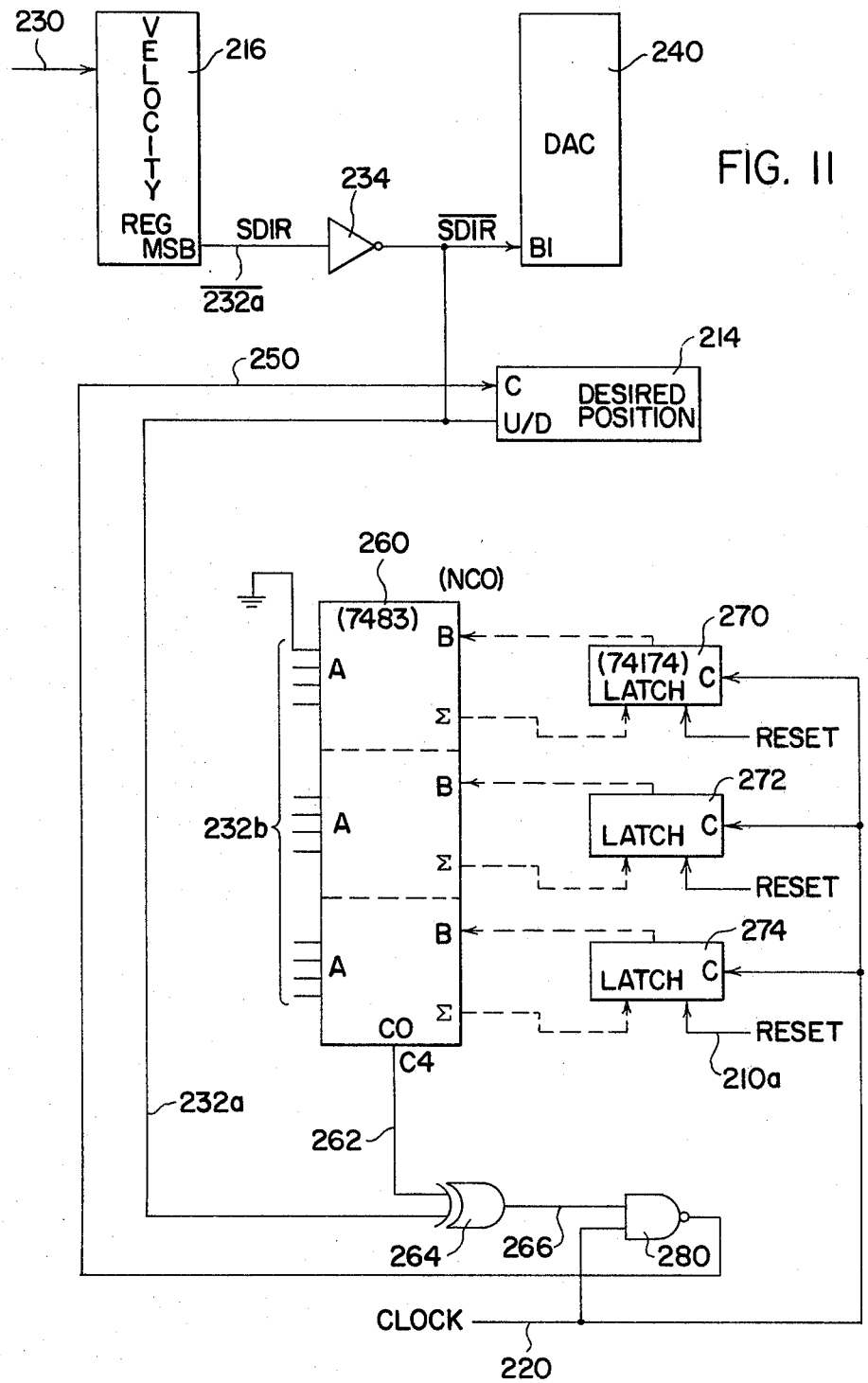
FIG. 11 is a simplified partial wiring diagram illustrating certain phase relationship and pulsing features employed in the preferred embodiment of the present invention; and, FIG. 12 is a pulse chart illustrating certain operating characteristics of the preferred embodiment as shown in FIGS. 8 and 11, and, FIG. 13 is a schematic block diagram showing the signal generating circuit of the preferred embodiment of the invention.

As previously mentioned, any number of digital circuits could be used for creating an analog difference signal which is the difference between the actual position determined by an encoder and an expected position determined by a counter which is updated during a timing frame or timing interval by the magnitude of velocity being used during that interval. In the preferred embodiment of the invention, the 2's complement coding is used for register 214 so that an adder circuit 30a can be employed to produce a difference signal. When this concept is used, the numerical controlled oscillator for controlling the pulse rate in line 250 can take the component form as shown in FIG. 11 wherein updating line 250 provides the counting pulses in both the up and down directions for the register 214. A cascaded group of three summing networks, jointly referred to as circuit 260, is provided with the carry line 262 being connected to one input of an EXCLUSIVE OR gate 264 having an output 266. Quad-latches 270, 272, 274 circulate the output sum of the summing networks back to the B terminals of the networks in circuit 260 so that a clocking pulse from the system clock 220 causes an overflow at line 262 at a rate determined by the code on lines 232b. These lines are the velocity code excluding the most significant bit which controls the logic on line 232a. During each clocking cycle, the sum of each summing network is latched into the B terminals of one of the latches to upcount the summing networks until there is a count overflow. The higher the initial number in a binary sense, the higher the pulsing rate at output 262. This pulsing rate from the carry terminal C4 is logically combined with the logic on sign line 232a to control the logic of output 266. This logic opens and closes NAND gate 280, which gate produces the output pulses in line 250. In FIG. 11, the general scheme for controlling the positional error signal by an updated expected position register is generally set forth. As can be seen, the positional error in line 24 creates an analog signal in this line which is added to a fixed analog signal during a given frame or timing interval. This produces a modulated control reference signal in line 12 for controlling the operation of unit B during a time frame.

Various modifications may be made in the system to produce the inventive concepts as set forth in the appended claims. Referring now to FIG. 13, a schematic layout of the preferred system controller 200 is illustrated. In practice one system controller can operate more than one module C. To create the clocking pulses in line 220 for oscillator 210, there is provided a crystal controlled oscillator 300 with pulses gated through a numerical controlled oscillator 302 by the code on a series of lines represented as a single line 304 which are the output lines or terminals of a register 306. This register receives a code indicating the length of the time frame. The pulses in line 220 are counted by a binary counter 310 to stop the pulses in in line 220 by resetting register 306 through line 312. This signals the end of a frame, which in practice is generally a fixed number of pulses, such as 2048 counts, in line 220. As the register 306 selects a different frame length, the counting rate of pulses in line 220 is changed. As previously discussed, the gain signal in line 222 is also changed with length of the time frame. This is done in practice by a digital to analog converter 314 of the type previously described. The code in register 306 during a selected frame controls the gain signal in line 222 for the purpose previously described. Counter 310 also produces a signal in line 316 to inform the computer C that a frame has been completed. When the frame length is changed, the controlled unit progresses to a position determined by the velocity word in register 216 at a rate selected by controller 200. Thus, the desampling during the frame or time interval remains the same. Other system controllers and arrangements for providing the variable frame information can be devised by persons in the servo controller art. System A shown in FIGS. 1 and 8, provides a velocity error correction feature. As is well known in the servo control art, the servo damping tachometer T provides a feedback signal which introduces a velocity lag error. The signal in line 22 is a constant level during a time frame. This signal in line 22 provides an estimate of the derivative of motion which tends to offset the like error signal in line 14 from the tachometer. The system shown in FIGS. 1 and 8 in one sense uses the velocity estimation signal from converter 240, to provide basic wideband (fast response) control over the controlled velocity servo unit B with a lower bandwidth (slower response) digital correcting signal in line 24. Because of the wideband motion estimation control of the signal in line 22, velocity, acceleration and higher order lag errors are substantially minimized in system A. The numerical controlled oscillator 210, as shown in FIG. 11, provides uniformly spaced pulses as shown in FIG. 12 when either counting up or counting down the spacing changes with the velocity code and the system time frame. At the junction between time frames pulses are spaced to prevent close occurance of the last pulse of one time frame and the first pulse of the next time frame. Also, since reset 210 a occurs only at the start of a sequence, if only a partial time frame is processed, oscillator 210 retains the partial count or phase for count completion later. This characteristics of the preferred embodiment implies phase coherency from frame-to-frame. During processing of a given sequence, the time frame or interval is changed to provide increase exposure time as a camera approaches its subject, when system A is used for photographic purposes.

Having defined the invention it is claimed:

1. A system for creating a control reference signal for a remote electrical servo device having a movable output unit wherein the velocity and position of said output unit are controlled by the magnitude of said control reference signal, said system including means for creating a first fixed analog signal indicative of a known velocity for said unit during a preselected controlled time interval in response to a binary code indicative of said velocity during said interval; means for creating a desired time base positional profile during said time interval; means for detecting the actual time base positional profile of said unit during said time interval; means for creating a second analog signal generally proportional to the algebraic difference between said actual and desired time base positional profiles a plurality of times during said interval; means for changing said binary code to change said preselected time interval and means for creating said control reference signal as a function of said first and second analog signals.

2. A system as defined in claim 1 wherein said first analog signal creating means includes a digital register for storing the binary code for a preselected interval and a digital to analog converter for converting said code to said first analog signal.

3. A system as defined in claim 2 wherein said means for creating a desired time base positional profile include a bi-directional digital counter and means for incrementing or decrementing said counter periodically during said time interval at a rate controlled by said known velocity.

4. A system as defined in claim 3 wherein said means for detecting said actual time base positional profile includes a bi-directional counter and means for incrementing or decrementing said second mentioned counter periodically during said time interval in accordance with the direction and positional change of said unit.

5. A system as defined in claim 4 wherein said second analog signal creating means includes a digital comparator controlled by both of said counters and having means for creating a digital difference signal and means for converting said digital difference signal to said second analog signal.

6. A system as defined in claim 1 wherein said means for creating a desired time base positional profile include a bi-directional digital counter and means for incrementing or decrementing said counter periodically during said time interval at a rate controlled by said known velocity.

7. A system as defined in claim 6 wherein said means for detecting said actual time base positional profile includes a bi-directional counter and means for incrementing or decrementing said second mentioned counter periodically during said time interval in accordance with the direction and positional change of said unit.

8. A system as defined in claim 7 wherein said second analog signal creating means includes a digital comparator controlled by both of said counters and having means for creating a digital difference signal and means for converting said digital difference signal to said second analog signal.

9. A system as defined in claim 1 including means for creating a succession of said time intervals and means for changing said fixed analog signal during each of said intervals.

10. A system as defined in claim 9 wherein said first analog signal creating means includes a digital register for storing a digital number representing the amount of movement of said unit during said interval and a digital to analog converter for converting said digital number to said first analog signal.

11. A system as defined in claim 9 including means for storing successive digital data words each indicative of said known velocity during one of said successive intervals and means for controlling said first signal during successive intervals by said successive words.

12. A system as defined in claim 1 including means for controlling said fixed analog signal for a given time interval by a multiplying action of a binary code indicative of the amount of movement of said unit during a time interval and a reference level indicative of the length of said time interval; said means for creating a desired time base positional profile includes a bi-directional digital counter having a desired position stored therein and means for incrementing or decrementing said counter according to the known velocity and the rate of a system clock; and, means for varying said reference level and said rate in direct proportion.

13. A system as defined in claim 12 including means for controlling the sign of said fixed analog signal by the binary logic on at least one bit of said binary code and means for selectively incrementing or decrementing of said counter by said binary logic.

14. A system for creating a control reference signal for a remote electrical servo device having a movable output unit wherein the velocity and position of said output unit are controlled by the magnitude of said control reference signal, said system operable over a cycle including a number of separate controlled time intervals including means responsive to a binary code for creating a first fixed analog signal indicative of a fixed velocity of said unit during a preselected controlled time interval; means for creating a desired time base positional profile in digital form during said time interval; means for detecting the actual time base positional profile of said unit during said time interval; means for creating a digital representation of said actual profile; means for creating a second analog signal generally proportional to the algebraic difference between said digital actual profile and said digital desired time base positional profiles at various times during said interval; means for creating said control reference signal as a function of said first and second analog signals; and means for changing said binary code for successive time intervals of said cycle.

15. A system for creating a control reference signal for a remote electrical servo device having a movable output unit wherein the velocity of said output unit is controlled by the magnitude of said control reference signal, said system including means for creating a succession of digital signals coded for the desired position of change of said unit during preselected time intervals; means for storing one of said digital signals during each of successive time intervals; means for creating an analog signal representative of said stored digital signal and a selected interval length during a given interval; means for creating said control reference signal by said created analog signal during each of said intervals and, means for modifying said reference signal by the instantaneous difference between the actual position of said unit and the desired position of said unit at selected times during a time interval.

16. A system for creating a control reference analog signal for a remote electrical servo device having an output unit movable by a D.C. motor wherein the speed and direction of rotation of said motor is controlled by the magnitude and polarity, respectively, of said control reference signal, said system comprising: a summing circuit for creating said analog control signal at an output, said control signal being proportional to the algebraic sum of a first input signal at a first input and a second input signal at a second input; means for creating a first controllable signal proportional to a digital representation of a desired amount of movement of said output unit in between two control positions and in a selected direction during a preselected time interval; first directing means for directing said first controllable signal to said first input; means for creating a second controllable signal proportional to the difference between a digital representation of the position of said output unit between said control positions during said time interval and a digital representation of a desired position of said output unit during said time interval and between said control positions; second directing means for directing said second controllable signal to said second input; and means for progressively changing said desired position digital representation in a numerical sense between digital representations corresponding to intermediate positions between said two control positions.

17. A system as defined in claim 16 wherein said first directing means includes means for converting said first controllable signal from a digital signal to an analog signal.

18. A system as defined in claim 17 wherein said second directing means includes means for converting said second controllable signal from a digital signal to an analog signal.

19. A system as defined in claim 16 wherein said second directing means includes means for converting said second controllable signal from a digital signal to an analog signal.

20. A system as defined in claim 19 wherein said progressively changing means includes a register for storing said desired position digital representation, means for generating evenly spaced pulses having a controlled number during said time interval and means for changing said digital representation by each of said pulses between representations corresponding to said two control positions during said time interval.

21. A system as defined in claim 20 wherein said spacing is changeable during each successive time interval.

22. A system as defined in claim 16 wherein said progressively changing means includes a register for storing said desired position digital representation, means for generating evenly spaced pulses having a controlled number during said time interval and means for changing said digital representation by each of said pulses between representations corresponding to said two control positions during said time interval.

23. A system as defined in claim 17 wherein said progressively changing means includes a register for storing said desired position digital representation, means for generating evenly spaced pulses having a controlled number during said time interval and means for changing said digital representation by each of said pulses between representations corresponding to said two control positions during said time interval.

24. A system as defined in claim 22 wherein said first directing means includes means for converting said first controllable signal from a digital signal to an analog signal.

25. A system as defined in claim 23 including means for changing the relative value of said analog signal with respect to said digital signal in response to a binary code, means for changing the spacing between said pulses in response to a clocking pulse train with a pulse rate and means for controlling said clock pulse rate by said binary code.

26. A system as defined in claim 25 including means for changing the value of said analog signal with respect to said digital signal in response to a second binary code and means for changing the spacing between said pulses in response to said second binary code.

27. A system as defined in claim 22 including means for changing the spacing between said pulses in response to a clock pulse train with a pulse rate and means for controlling said rate by a binary code.

28. A system as defined in claim 27 including means for converting said first controllable signal from a digital signal to an anlog signal, means for changing the value of said analog signal with respect to said digital signal in response to a second binary code and means for changing the spacing between said pulses in response to said second binary code.

* * * * *